United States Patent
Spano et al.

(10) Patent No.: US 6,606,526 B1
(45) Date of Patent: Aug. 12, 2003

(54) SYSTEM BEHAVIOR MODIFICATION FOR MAINTENANCE OF CHAOS

(75) Inventors: Mark L. Spano, Laurel, MD (US); William L. Ditto, Woodstock, GA (US); Visarath In, Atlanta, GA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 174 days.

(21) Appl. No.: 09/962,300

(22) Filed: Sep. 26, 2001

Related U.S. Application Data

(63) Continuation of application No. 08/687,063, filed on Jul. 8, 1996, now abandoned.

(51) Int. Cl.[7] ............................................. G06F 155/00
(52) U.S. Cl. .............................. 700/91; 700/31; 700/32; 700/46; 700/90; 607/2; 607/5; 607/45; 607/46; 380/263
(58) Field of Search ............................. 700/28, 29, 30, 700/31, 32, 47, 46, 90, 91; 607/2, 5–9, 45, 46, 70–72, 74, 116, 118, 544, 545; 600/518, 519; 380/263

(56) References Cited

U.S. PATENT DOCUMENTS

| | | | | |
|---|---|---|---|---|
| 5,312,443 A | * | 5/1994 | Adams et al. | 607/5 |
| 5,342,401 A | | 8/1994 | Spano et al. | |
| 5,379,346 A | * | 1/1995 | Pecora et al. | 380/263 |
| 5,439,004 A | * | 8/1995 | Duong-Van et al. | 600/518 |
| 5,442,510 A | * | 8/1995 | Schwartz et al. | 700/32 |
| 5,447,520 A | | 9/1995 | Spano et al. | |
| 5,473,694 A | * | 12/1995 | Carroll et al. | 380/263 |
| 5,522,863 A | | 6/1996 | Spano et al. | |
| 5,655,022 A | * | 8/1997 | Carroll | 380/263 |
| 5,797,965 A | | 8/1998 | Spano et al. | |
| 5,857,978 A | * | 1/1999 | Hively et al. | 600/544 |

OTHER PUBLICATIONS

Physical Review Letters, vol. 74, No. 22 pp. 4420–4423 published May 29, 1995.

* cited by examiner

*Primary Examiner*—Ramesh Patel
(74) *Attorney, Agent, or Firm*—Jacob Shuster

(57) ABSTRACT

An accessible parameter of a chaos embodying system of a physical or biological type is monitored by extraction of measurement data and recordation thereof on a return map as a dynamic representation of the system activity, from which the magnitude and timing of intervention is determined and applied to the system in order to sustain chaos behavior.

10 Claims, 2 Drawing Sheets

SYSTEM BEHAVIOR MODIFICATION FOR MAINTENANCE OF CHAOS

CROSS-REFERENCE TO RELATED APPLICATION

The present application is a continuation of its parent application, Ser. No. 08/687,063 filed Jul. 8, 1996 now abandoned.

The invention covered in the present application relates in general to behavior modifying control of pulsating activity in different types of systems.

BACKGROUND OF THE INVENTION

Pulsating activity systems are disclosed in U.S. Pat. Nos. 5,342,401, 5,447,520, 5,522,863 and 5,797,965 to Spano et al., such patents being issued from applications which are interrelated with the parent application of the present application by virtue of at least two common co-inventors and by sequential copendency beginning with the filing of the earliest of the applications for U.S. Pat. No. 5,342,401 on Aug. 19, 1992 to the filing date of Jul. 8, 1996 for the parent application of the present application, which was a continuation-in-part of the application which matured into the aforementioned U.S. Pat. No. 5,797,965. During pendency of the applications from which the aforementioned U.S. Pat. Nos. 5,342,401, 5,447,520 and 5,522,863 matured, an article authored by the co-inventors in the present application and relevant to the present invention was published May 29, 1995 in "Physical Review Letters", Vol. 74, No. 22, on pages 4420–4423. The disclosures in all four of the aforementioned U.S. Patents to Spano et al., as well as that of the latter referred to publication are incorporated herein by reference.

Pulsating activities exhibiting a deterministic phenomenon known as chaos exists in both physical and biological systems. Such a physical system is known to be established for example in a magneto-elastic ribbon anchored at one end and to which a sinusoidally varying magnetic field is applied to induce therein intermittent chaos. Biological systems on the other hand involving living tissue or neural networks within which chaos is induced, are disclosed in the aforementioned U.S. patents to Spano et al. Such disclosures cover utility methods involving activity modification of the system, which is effected through electrical stimuli intervention following measurement recording and monitoring of pulsating activity events plotted on a return map from which various control strategies are determined for computer programmed behavior modification.

It is therefore an important object of the present invention to provide a more readily implemented strategy for sustaining chaos behavior in systems which otherwise exhibit intermittent or transient chaos, such those referred to in the aforementioned U.S. patents to Spano et al. in connection with useful purposes such as medical diagnosis and treatment of cardiac arrhythmia and treatment of epileptic foci in the neuronal network of living brain tissue.

SUMMARY OF THE INVENTION

In accordance with the present invention, an anticontrol method for maintenance of chaos behavior in a system exhibiting periodicity, involves infrequent application of time-dependent perturbations of a single parameter of the system which is readily accessible to measurement and recordation as graphical points on a return map providing a dynamic representation of the system being monitored. The concentration of graphical measurement points within a plurality of regions are located and identified on the return map as following paths or routes toward a loss region from which periodicity follows. Transition to periodicity occurs from the loss region when progression from chaos behavior along one route is initiated. A behavior modifying signal is applied to the system upon initiation of the progression toward periodicity to cause diversion from such route. Loss of chaos is thereby prevented without interference with progression along other routes to the loss region in order to reliably sustain chaos.

The success of the foregoing chaos anticontrol method has been demonstrated in a physical type of system having a magnetoelastic ribbon clamped at one end, as referred to in the aforementioned publication "Physical Review Letters", volume 74, Number 22, pages 4420–4423.

In accordance with the present invention, the measurement data heretofore obtained from a chaos embodying system to dynamically represent its pulsating activity by plotting on a return map, is utilized to institute intervention for chaos maintenance in either a physical or a biological system. Thus, the concentration of plotted measurement data points within the loss region on the return map is monitored in order to control the timing and magnitude of an intervention signal based on the location of such loss region along a path of progression from chaos to periodicity.

BRIEF DESCRIPTION OF THE DRAWING FIGURES

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENTS

Figure 1:
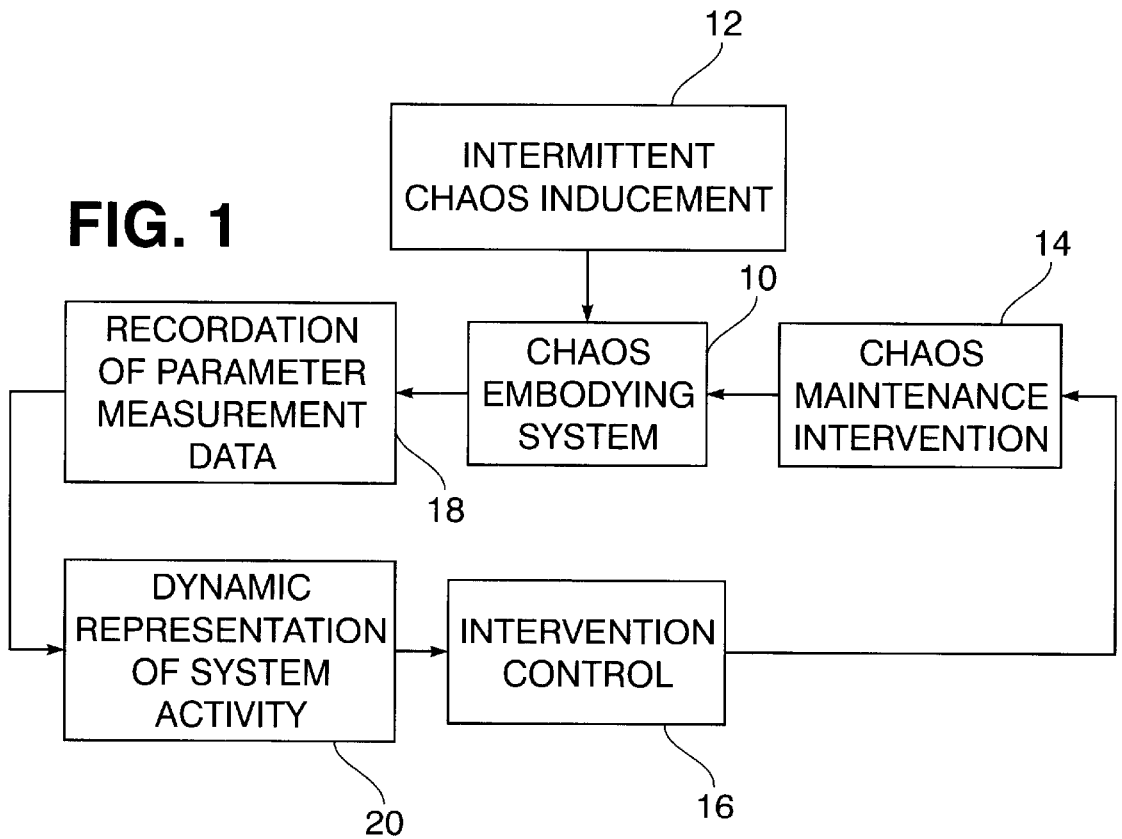
FIG. 1 is a block diagram of a method in accordance with the present invention.

Referring now to the drawing in detail, FIG. 1 denotes a chaos embodying biological or physical system 10, such as those associated with a neuronal network of a brain tissue or an anchored magnetoelastic ribbon, with which the present invention may be associated. The chaos regime of pulsating activity induced in the system 10 is intermittent, as denoted by reference numeral 12, for which reason chaos maintenance intervention 14 is applied to system 10 for activity behavior modification as in the case of the anti-control strategy program indicated in U.S. Pat. No. 5,522,863 aforementioned. The chaos maintenance intervention is accordingly subject to intervention control 16 derived from system parameter measurement data 18 recorded dynamic representation 20 of system activity in the form of a return map, such as those also described in U.S. Pat. No. 5,522,863 with respect to FIGS. 3A and 3B therein.

Figure 2:
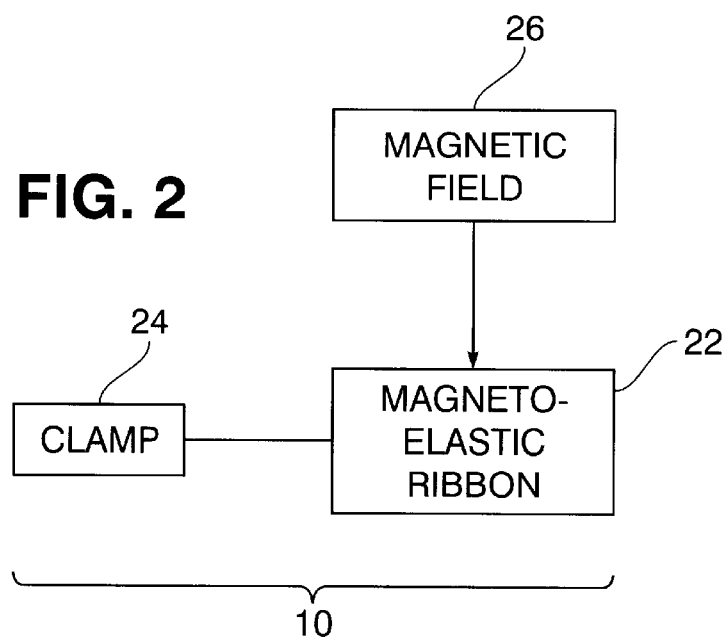
FIG. 2 is a block diagram depicting a physical type of chaos embodying system covered by the method diagrammed in FIG. 1.

In addition to chaos maintenance intervention for biological types of systems involving application of electrical energy perturbations thereto, such intervention is also applicable to physical or mechanical types of chaos embodying systems, including for example the system depicted in FIG. 2 having a magnetoelastic ribbon 22 anchored at one end by a clamp 24 and subject to a magnetic field 26. Inducement of intermittent chaos activity in such a mechanical system is achieved by sinusoidal variation of the magnetic field 26.

Figure 3:
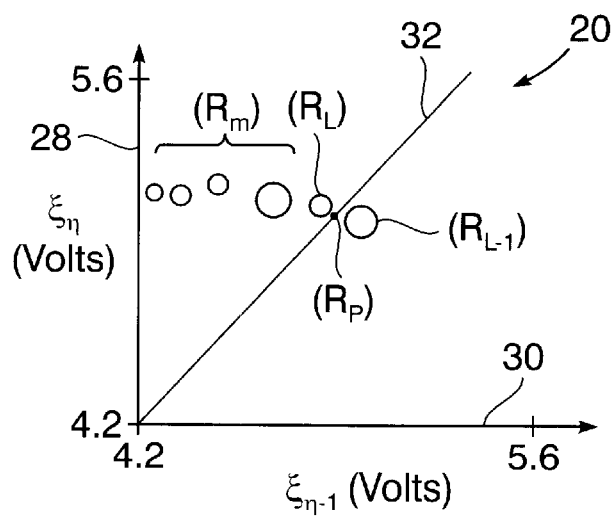
FIG. 3 is a return map typically plotting the pulsating activity of the chaos embodying system being modified by the method diagrammed in FIG. 1.

The return map type of dynamic representation 20 shown in FIG. 3, such as that described in U.S. Pat. No. 5,522,863, graphically plots time-dependent data as an activity parameter in the form of electrical voltage measurements ($\xi n$) along an ordinate scale 28 characterizing interburst events during intervals ($I_n$) against voltage measurements ($\xi_{n-1}$) along an abscissa scale 30 during previous event intervals ($I_{n-1}$). A chaos activity regime is thereby identified on the return map 20 by an unstable fixed point ($R_p$). Such unstable fixed point ($R_p$) is the point of intersection of a diagonal line of identity 32 with an unstable directional manifold constituting a path along which measurement data points approach and depart from the chaos regime as explained in U.S. Pat. No. 5,522,863. FIG. 3 also shows circular regions on the return map within which such measurement data points are concentrated interate points (p) within circle ($R_{L-1}$) characterized by the equation $\xi n = \overline{f}(\xi_{n-1}, \rho)$. During transition of system activity from chaos to periodicity, the measurement data points referred to as preiterates fall within a loss region ($R_L$) from which the points move to regions ($R_m$) along the unstable directional manifold also shown in FIG. 3. Thus, both the existence of a chaos regime and departure therefrom along a progression path to periodicity forms the basis for monitoring the activity and determining the timing and magnitude of intervention through control 16 as diagrammed in FIG. 1.

Figure 4:
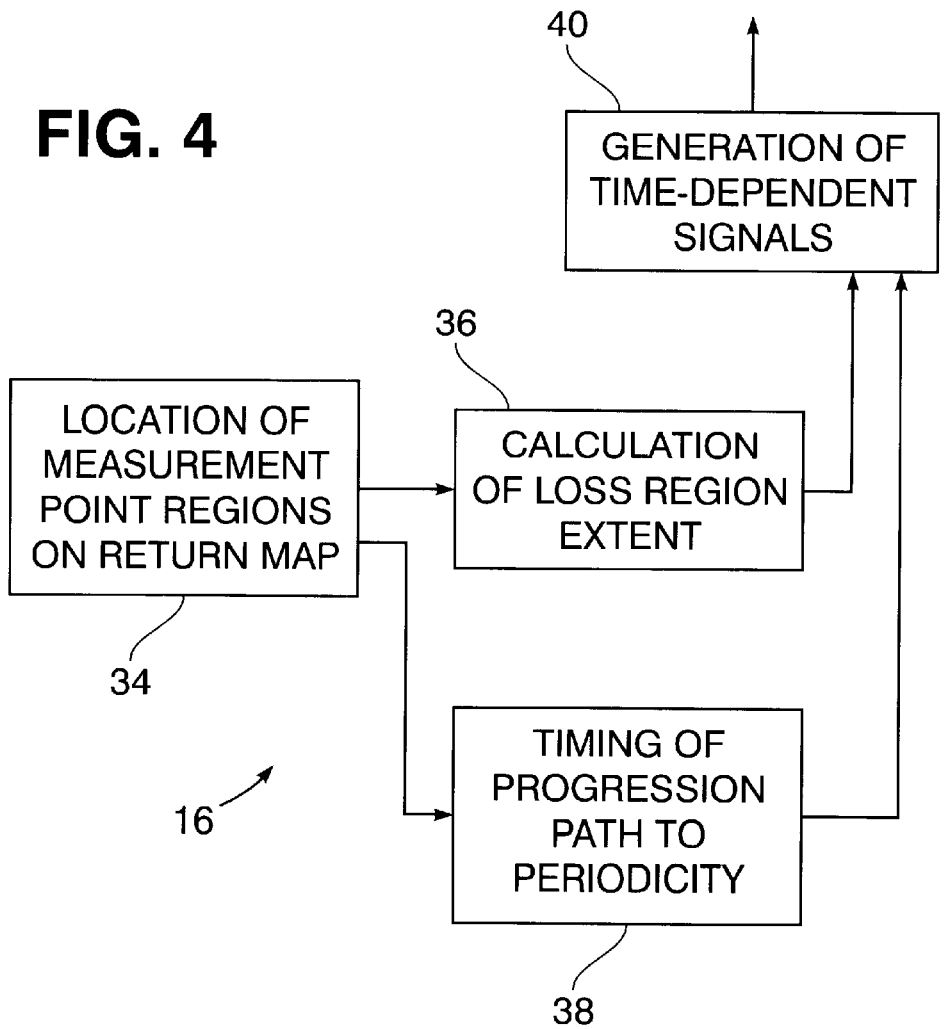
FIG. 4 is a more detailed block diagram of the intervention control component of the method depicted in FIG. 1.

The intervention control 16 involves location of the measurement point regions $R_m$, $R_L$ and $R_{L-1}$ on the return map 20 as denoted by reference numeral 34 in FIG. 4. Calculation of the extent of the loss region ($R_L$) and initiation of a progression path to periodicity, respectively denoted by reference numerals 36 and 38, then follows so as to effect generation of time-dependent signals applied to produce the chaos maintenance intervention as denoted by reference numeral 40 in FIG. 4. Such calculations have been performed with success from experimental measurement data plotted on the return map 20 for a physical type of system to determine the timing of intervention and to minimize the magnitude of such intervention based on the extent of the loss region ($R_L$) within which the measurement points fall during departure from the unstable fixed point ($R_p$). When instituted, the intervention causes locational change in or diversion of the measurement points in a direction along the unstable manifold for restoration and maintenance of chaos.

Obviously, other modifications and variations of the present invention may be possible in light of the foregoing teachings. It is therefore to be understood that within the scope of the appended claims the invention may be practiced otherwise than as specifically described.

What is claimed is:

1. A method of modifying activity of a system within which chaos occurs intermittently by intervention, including the steps of: recording said activity of the system in terms of a time-dependent parameter thereof: plotting the recording of said parameter as measurement points on a return map to form a dynamic representation of the system activity; identifying a chaos regime of said activity by monitoring variations in the plotted parameter; and instituting said intervention to the activity of the system following said identification of the chaos regime for maintenance thereof.

2. The method as defined in claim 1 wherein said step of identifying the chaos regime includes: locating regions on the return map within which the plotted measurement points are concentrated; and monitoring approach of the plotted measurement points within said regions toward an unstable fixed point.

3. The method as defined in claim 2 wherein said step of instituting the intervention causes changes in the plotted measurement points on the return map to form one of the monitored regions during approach to said unstable fixed point.

4. The method as defined in claim 3 wherein said step of instituting the intervention includes: monitoring departure of the plotted measurement points from the unstable fixed point; and initiating the intervention when the measurement points on the return map form another of said monitored regions during said departure from the unstable fixed point.

5. The method as defined in claim 2 wherein said step of instituting the intervention includes: monitoring departure of the plotted measurement points from the unstable fixed point; and initiating the intervention when the measurement points on the return map progress from another of said monitored regions during said departure from the unstable fixed point.

6. The method as defined in claim 1, wherein said system is a neuronal network in brain tissue for medical diagnosis and treatment by the anticontrol method.

7. The method as defined in claim 1, wherein said system involves an anchored magnetoelastic ribbon subjected to a magnetic field that is sinusoidally varied by said intervention to intermittently induce said chaos.

8. A method of modifying activity of a system intervention, including the steps of:

measuring a parameter of said activity in terms of time-dependent data; recording said time-dependent data to form a dynamic representation of said activity; monitoring changes in the data recorded on said dynamic representation to identify approach and departure of the activity from a chaos regime; and instituting said intervention in the activity in response to the monitoring of said departure from the chaos regime to restore and maintain the chaos regime.

9. In an anticontrol method of maintaining chaos within a system by perturbation of an accessible parameter of the system to interrupt progression thereof to periodic behavior, the improvement residing in the steps of: formulating a dynamic representation of the system reflecting variation of said parameter by measurement points on a return map; locating a loss region of measurement points on the return map along a path of said progression to the periodic behavior; generating a behavior modifying signal to divert the measurement points from said path; and applying said behavior modifying signal to the system for said perturbation of the parameter during said progression thereof along said path from the loss region.

10. The method as defined in claim 9, wherein said system is biological.

* * * * *